(12) United States Patent
Bhat et al.

(10) Patent No.: US 9,430,558 B2
(45) Date of Patent: Aug. 30, 2016

(54) AUTOMATIC DATA INTERPRETATION AND ANSWERING ANALYTICAL QUESTIONS WITH TABLES AND CHARTS

(71) Applicant: International Business Machines Corporation, Armonk, NY (US)

(72) Inventors: Sandesh Bhat, Acton, MA (US); Joy Mustafi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/681,594

(22) Filed: Apr. 8, 2015

(65) Prior Publication Data

US 2016/0078772 A1  Mar. 17, 2016

Related U.S. Application Data

(63) Continuation of application No. 14/488,908, filed on Sep. 17, 2014.

(51) Int. Cl.
*G09B 7/00* (2006.01)
*G06F 17/30* (2006.01)
*G06F 7/544* (2006.01)

(52) U.S. Cl.
CPC ......... *G06F 17/30654* (2013.01); *G06F 7/544* (2013.01); *G09B 7/00* (2013.01); *G06F 17/30684* (2013.01)

(58) Field of Classification Search
CPC .. G06F 17/2785; G06F 17/215; G06F 17/28; G06F 17/30654; G06F 17/30867; G06F 17/288
See application file for complete search history.

(56) References Cited

U.S. PATENT DOCUMENTS 5,442,780 A * 8/1995 Takanashi ........... G06F 17/3043
5,995,659 A * 11/1999 Chakraborty ...... G06K 9/00456
                                                              382/176

(Continued)

FOREIGN PATENT DOCUMENTS

JP    2012141910 A    7/2012
WO    2006042028 A2   4/2006
WO    2009140473 A1   11/2009

OTHER PUBLICATIONS

IBM, "List of IBM Patents or Patent Applications Treated as Related (Appendix P)," Apr. 9, 2015.

(Continued)

*Primary Examiner* — Matthew Baker
(74) *Attorney, Agent, or Firm* — Patricia B. Feighan; Terrence J. Carroll

(57) ABSTRACT

A method providing an answer to at least one analytical question containing at least one table or at least one chart is provided. The method may include receiving an input question. The method may also include extracting a plurality of information from the input question based on a natural language analysis. The method may further include forming a well-defined sentence. The method may include extracting at least one table or at least one chart associated with the input question. The method may include forming at least one mathematical equation. The method may also include solving the at least one mathematical equation. The method may include determining the answer to the input question in natural language based on the solved at least one mathematical equation. The method may further include narrating the determined answer to the input question in natural language.

8 Claims, 10 Drawing Sheets

(56) References Cited

U.S. PATENT DOCUMENTS

| | | | |
|---|---|---|---|
| 7,792,829 | B2 | 9/2010 | Brill et al. |
| 8,275,803 | B2 | 9/2012 | Brown et al. |
| 8,332,394 | B2 | 12/2012 | Fan et al. |
| 8,364,488 | B2 | 1/2013 | Kurzweil et al. |
| 8,538,744 | B2 | 9/2013 | Roberts et al. |
| 8,655,866 | B1 | 2/2014 | Provine et al. |
| 8,700,620 | B1* | 4/2014 | Lieberman ........ G06F 17/30731 707/728 |
| 2003/0115192 | A1 | 6/2003 | Kil et al. |
| 2004/0253569 | A1 | 12/2004 | Deane et al. |
| 2005/0080614 | A1* | 4/2005 | Bennett .................... G06F 17/27 704/9 |
| 2006/0036512 | A1 | 2/2006 | Maccarthy et al. |
| 2006/0173834 | A1* | 8/2006 | Brill .................. G06F 17/30554 |
| 2008/0097748 | A1* | 4/2008 | Haley ................. G06F 17/2785 704/9 |
| 2009/0112787 | A1* | 4/2009 | Ginzberg ............... G06N 5/025 706/47 |
| 2009/0287678 | A1 | 11/2009 | Brown et al. |
| 2010/0077032 | A1 | 3/2010 | Drennan et al. |
| 2011/0153312 | A1 | 6/2011 | Roberts |
| 2013/0007033 | A1 | 1/2013 | Brown et al. |
| 2013/0013615 | A1 | 1/2013 | Brown et al. |
| 2013/0024487 | A1 | 1/2013 | Yi |
| 2013/0031082 | A1* | 1/2013 | Wolfram ........... G06F 17/30401 707/706 |
| 2013/0226562 | A1* | 8/2013 | Arnon ............... G06F 17/30831 704/9 |
| 2013/0226846 | A1 | 8/2013 | Li et al. |
| 2013/0262501 | A1 | 10/2013 | Kuchmann-Beauger et al. |
| 2013/0275122 | A1 | 10/2013 | Park et al. |
| 2014/0040312 | A1 | 2/2014 | Gorman et al. |
| 2014/0075410 | A1* | 3/2014 | Wolfram .................... G06F 8/30 717/106 |
| 2014/0229497 | A1* | 8/2014 | Wolfram ........... G06F 17/30569 707/758 |
| 2014/0250130 | A1 | 9/2014 | Stockton et al. |
| 2014/0258817 | A1* | 9/2014 | Carrier .................. G06F 17/211 715/202 |
| 2014/0280256 | A1* | 9/2014 | Wolfram ........... G06F 17/30943 707/755 |
| 2014/0316768 | A1 | 10/2014 | Khandekar |
| 2015/0019946 | A1* | 1/2015 | Zarras ................. G06F 3/04842 715/219 |
| 2015/0324413 | A1 | 11/2015 | Gubin et al. |
| 2015/0331846 | A1* | 11/2015 | Guggilla ............. G06F 17/2705 715/9 |

OTHER PUBLICATIONS

Bhat et al., "Automatic Data Interpretation and Answeing Analytical Questions With Tables and Charts," Filed on Sep. 17, 2014, p. 1-36, U.S. Appl. No. 14/488,908.

Mungi et al, "Solving and Answering Arithmetic and Algebraic Problems Using Natural Language Processing," Filed on Jun. 17, 2014, p. 1-47, U.S. Appl. No. 14/306,267.

Mungi et al., "Solving and Answering Arithmetic and Algebraic Problems Using Natural Language Processing," Filed on Aug. 29, 2014, p. 1-44, U.S. Appl. No. 14/472,554.

Mungi et al., "Answering Time-Sensitive Questions," Filed on Aug. 7, 2014, p. 1-43, U.S. Appl. No. 14/453,891.

Bergstein, "Intelligent Solutions, Your Brain, Analytical Thinking," Wolters Kluwer Solutions, Oct. 3, 2011, p. 1, http://solutions.wolterskluwer.com/blog/2011/10/intelligent-solutions-your-brain-analytical-thinking/, Accessed on Sep. 8, 2014.

Bhat et al., "Automatic Data Interpretation and Answering Analytical Questions With Tables and Charts," Filed on Sep. 17, 2014, p. 1-36, U.S. Appl. No. 14/488,908.

Ç akiroglu, "Can Computer Understand and Solve Turkish Arithmetic Problems?," World Applied Sciences Journal, 2008, p. 311-317, vol. 5, Issue 3, IDOSI Publications.

Carasco, "Free math problem solver," Basic-mathematics.com, p. 1-3, http://www.basic-mathematics.com/free-math-problem-solver.html, Accessed on May 8, 2014.

Chudov, "Algebra Homework Help—People's Math!," Algebra Homework Help, Algebra Solvers, Free Math Tutors, p. 1-3, http://www.algebra.com/, Accessed on May 8, 2014.

CMU, "Parse a sentence," Link Grammar, p. 1, Carnegie Mellon University, http://www.link.cs.cmu.edu/link/submit-sentence-4.html, Accessed on May 8, 2014.

Cornell, "What is Anaphora Resolution'?," 2000, p. 1, http://www.cs.cornell.edu/boom/2000sp/2000%20projects/anaphora/definition.html, Accessed on May 8, 2014.

Deane et al, "Automatic Item Generation via Frame Semantics: Natural Language Generation of Math Word Problems," Educational Testing Service, 2003, p. 1-26.

Demir et al., "Interactive SIGHT into Information Graphics," W4A2010 Technical, Apr. 26-27, 2010, ACM, Raleigh.

Dumais et al., "Web Question Answering: Is More Always Better?," SIGIR'02, Aug. 11-15, 2002, ACM, Tampere, Finland.

Filloy et al., "Arithmetic/Algebraic Problem-Solving and the Representation of Two Unknown Quantities," Proceedings of the 28th Conference of the International Group for the Psychology of Mathematics Education, 2004, p. 391-398, vol. 2, PME28, Cinvestav, Mexico.

Finkel et al., "Stanford Named Entity Recognizer (NER)," The Stanford Natural Language Processing Group, Last Updated Jan. 4, 2014, p. 1-4, Version 3.3.1, http://nlp.stanford.edu/software/CRF-NER.shtml, Accessed on Jun. 3, 2014.

Gelb, "Experiments with a Natural Language Problem-Solving System," Computer Understanding I (Communication), 1971, p. 455-462, Session No. 10, IBM Corporation, Systems Development Division, Poughkeepsie, New York.

Google, "Calculator and unit converter," Search Help, p. 1-2, https://support.google.com/websearch/answer/3284611?hl=en, Accessed on May 8, 2014.

Gray, "Research on the Problem of Translating Natural Language Sentences into Algebra," The Mathematics Editor, Summer 1995, p. 41-43, vol. 6, No. 2.

Hinsley et al., "From Words to Equations Meaning and Representation in Algebra Word Problems," Cognitive Processes in Comprehension, 1977, p. 89-106, Chapter 4. Algebra Word Problems, Lawrence Erlbaum Associates, Hillsdale, NJ.

IBM, "IBM Exploratory Computer Vision," IBM Research, Last Updated Sep. 7, 2013, p. 1, http://researcher.watson.ibm.com/researcher/view_group.php?id=1903, Accessed on Sep. 8, 2014.

IBM, "IBM i2 Text Chart," IBM Software White Paper, Nov. 2012, p. 1-11, IBM Corporation.

India Bix, "Bar Charts—Data Interpretation Questions and Answers," 2014 IndiaBix Technologies, p. 1-2, http://www.indiabix.com/data-interpretation/bar-charts/, Accessed on Sep. 8, 2014.

India Bix, "Line Charts—Data Interpretation Questions and Answers," 2014 IndiaBix Technologies, p. 1-2, http://www.indiabix.com/data-interpretation/line-charts/, Accessed on Sep. 8, 2014.

India Bix, "Pie Charts—Data Interpretation Questions and Answers," 2014 IndiaBix Technologies, p. 1-2, http://www.indiabix.com/data-interpretation/pie-charts/, Accessed on Sep. 8, 2014.

India Bix, "Table Charts—Data Interpretation Questions and Answers," 2014 IndiaBix Technologies, p. 1, http://www.indiabix.com/data-interpretation/table-charts/, Accessed on Sep. 8, 2014.

Kerr, "SAT Tip of the Week: 4 Tips to Solve Pie Chart Questions," Veritas Prep, Posted on Sep. 18, 2013, p. 1-2, Veritas, LLC, http://www.veritasprep.com/blog/2013/09/sat-tip-of-the-week-4-tips-to-solve-pie-chart-questions/, Accessed on Sep. 8, 2014.

Kraf et al., "Syntactic ambiguity," Linguistics Online, p. 1, http://languagelink.let.uu.nl/~lion/?s=Grammar_exercises/grammar_4, Accessed on May 8, 2014.

Liguda et al., "Modeling Math Word Problems with Augmented Semantic Networks," NLDB, 2012, p. 247-252, LNCS 7337, Springer-Verlag Berlin Heidelberg.

Liu et al., "Using Stranger as Sensors: Temporal and Geo-sensitive Question Answering via Social Media," International World Wide Web Conference Committee, May 13-17, 2013, WWW 2013, ACM, Rio de Janiero, Brazil.

(56) References Cited

OTHER PUBLICATIONS

MacCartney et al., "Stanford Dependencies," The Stanford Natural Language Processing Group, p. 1-3, http://nlp.stanford.edu/software/stanford-dependencies.shtml, Accessed on May 8, 2014.

Marcus et al., "The Penn Treebank Project," Computer and Information Science Department at the University of Pennsylvania, Last Change: Feb. 2, 1999, p. 1-2, http://www.cis.upenn.edu/~treebank/, Accessed on May 8, 2014.

Moldovan et al., "Temporally Relevant Answer Selection," International Conference on Intelligence Analysis Proceedings, 2005, Language Computer Corporation, Richardson, Texas.

Morton et al., "A Novel Framework for Math Word Problem Solving," International Journal of Information and Education Technology, Feb. 2013, p. 88-93, vol. 3, No. 1.

Online Math Learning, "How to solve Algebra Word Problems?," p. 1-5, http://www.onlinemathlearning.com/algebra-word-problems.html, Accessed on May 8, 2014.

Petrov, "Online Math Problem Solver," Math10, p. 1-2, http://www.math10.com/en/problem-solver/, Accessed on May 8, 2014.

Pinto et al., "Table Extraction Using Conditional Random Fields," SIGIR'03, Jul. 28-Aug. 1, 2003, p. 235-242, ACM, Toronto, Canada.

Raphael, "Research on Intelligent Question-Answering Systems," The Clearinghouse for Federal Scientific and Technical Information, Period Covered: Apr. 15, 1966 through May 14, 1968, SRI Project 6001, Stanford Research Institute, Menlo Park, California.

Sanampudi et al., "A Question Answering System Supporting Temporal Queries," ICAC3, 2013, p. 207-214, CCIS 361, Springer-Verlag, Berlin Heidelberg.

Sanampudi et al., "Temporal Reasoning in Natural Language Processing: A Survey," International Journal of Computer Applications, 2010, p. 68-72, vol. 1, No. 4.

Saquete et al., "Splitting Complex Temporal Questions for Question Answering systems," Universidad de Alicante, 2004, Departamento de Lenguajes y Sistemas Informáticos, Alicante, Spain.

Sarmiento et al., "Co-constructed Narratives in Online, Collaborative Mathematics Problem-Solving," Virtual Math Teams Project, 2005, p. 1-8, The Math Forum @ Drexel University, Philadelphia, PA.

Singh et al., "Automatically Generating Algebra Problems," Association for the Advancement of Artificial Intelligence, 2012, Microsoft Research.

Stanford, "Stanford Parser," Stanford NLP, Last updated Jul. 10, 2012, p. 1, http://nlp.stanford.edu:8080/parser/, Accessed on May 8, 2014.

Tengli et al., "Learning Table Extraction from Examples," Carnegie Mellon University, 2004, School of Computer Science, Pittsburgh, PA.

Tseng et al., "On mapping natural language constructs into relational algebra through E-R representation," Republic of China National Science Council, 1992, p. 1-31, Hsinchu, Taiwan, ROC.

Wayne State University, "Analytical & Problem Solving Skills," Wayne LEADS, p. 1-2, http://hr.wayne.edu/leads/resource-guide/analytical-skills.php, Accessed on Sep. 8, 2014.

Webmath, "Welcome to Webmath!," WebMath—Solve Your Math Problem, p. 1-2, Discovery Education, http://www.webmath.com/index.html, Accessed on May 8, 2014.

Wei et al., "Answer Retrieval From Extracted Tables," Center for Intelligent Information Retrieval, 2004, University of Massachusetts Amherst, Amherst, MA.

Wei et al., "Table Extraction for Answer Retrieval," Center for Intelligent Information Retrieval, 2003, p. 1-26, University of Massachusetts Amherst, Amherst, MA.

Wikipedia, "Morphological analysis," Last Modified on Nov. 2, 2013, p. 1, Wikipedia: the Free Encyclopedia, http://en.wikipedia.org/wiki/Morphological_analysis, Accessed on May 8, 2014.

Wikipedia, "Named-entity recognition," Last Modified on May 13, 2014, p. 1-5, Wikipedia: the Free Encyclopedia, http://en.wikipedia.org/wiki/Named-entity_recognition, Accessed on Jun. 3, 2014.

Wikipedia, "Phrase chunking," Last Modified on Sep. 26, 2013, p. 1, Wikipedia: the Free Encyclopedia, http://en.wikipedia.org/wiki/Phrase_chunking, Accessed on Jun. 3, 2014.

* cited by examiner

Study the following table and answer the questions.

Number of Candidates Appeared and Qualified in a Competitive Examination from Different States Over the Years.

| State | 1997 | | 1998 | | Year 1999 | | 2000 | | 2001 | |
|---|---|---|---|---|---|---|---|---|---|---|
| | App. | Qual. | App. | Qual. | App. | Qual. | App. | Qual. | App. | Qual. |
| M | 5200 | 720 | 8500 | 980 | 7400 | 850 | 6800 | 775 | 9500 | 1125 |
| N | 7500 | 840 | 9200 | 1050 | 8450 | 920 | 9200 | 980 | 8800 | 1020 |
| P | 6400 | 780 | 8800 | 1020 | 7800 | 890 | 8750 | 1010 | 9750 | 1250 |
| Q | 8100 | 950 | 9500 | 1240 | 8700 | 980 | 9700 | 1200 | 8950 | 995 |
| R | 7800 | 870 | 7600 | 940 | 9800 | 1350 | 7800 | 945 | 7990 | 885 |

504

POS Tagging 506

Parsing 508

Dependency Analysis 510

Total number of candidates qualified from all the states together in 1997 is approximately what percentage of the total number of candidates qualified from all the states together in 1998?

502

512 — Information Retrieval and Natural Language Processing

Total number of (candidates qualified from (all the states together) in 1997) is approximately what percentage of the total number of (candidates qualified from (all the states together) in 1998) ?

| State | 1997 | | 1998 | | Year 1999 | | 2000 | | 2001 | |
|---|---|---|---|---|---|---|---|---|---|---|
| | App. | Qual. | App. | Qual. | App. | Qual. | App. | Qual. | App. | Qual. |
| M | 5200 | 720 | 8500 | 980 | 7400 | 850 | 6800 | 775 | 9500 | 1125 |
| N | 7500 | 840 | 9200 | 1050 | 8450 | 920 | 9200 | 980 | 8800 | 1020 |
| P | 6400 | 780 | 8800 | 1020 | 7800 | 890 | 8750 | 1010 | 9750 | 1250 |
| Q | 8100 | 950 | 9500 | 1240 | 8700 | 980 | 9700 | 1200 | 8950 | 995 |
| R | 7800 | 870 | 7600 | 940 | 9800 | 1350 | 7600 | 945 | 7990 | 885 |
| Total | | 4160 | | 5230 | | | | | | |
| Answer | | 79.541 | | | | | | | | |

702 — Linear Algebra and Statistical Modeling

| 8002 VERB / ACTION WORD | 8004 CORRELATED MATHEMATICAL OPERATOR(S) | 8006 OPERATES ON SUBJECT(S) | 8008 OPERATES ON OBJECT(S) |
|---|---|---|---|
| give(s) / gave | add (+) subtract (-) | subtract (-) | add (+) |
| take(s) / took | add (+) subtract (-) | add (+) | subtract (-) |
| distribute(s) / distributed | subtract (-) divide (/) | subtract (-) | divide (/) |
| has / had / have | equal (=) | equal (=) | equal (=) |
| equals / left with / remaining | equal (=) | equal (=) | equal (=) |
| is / be | equal (=) | equal (=) | equal (=) |

8010

| COEFFICIENTS / NUMERALS / QUALIFIER | CORRELATED MATHEMATICAL OPERATOR(S) | OPERATES ON SUBJECT(S) | OPERATES ON OBJECT(S) |
|---|---|---|---|
| coefficient / numeral / number | multiply (*) | multiply (*) (depends on context) | multiply (*) (depends on context) |
| times / number of times | multiply (*) | multiply (*) (depends on context) | multiply (*) (depends on context) |

Dictionary 114

FIG. 8

AUTOMATIC DATA INTERPRETATION AND ANSWERING ANALYTICAL QUESTIONS WITH TABLES AND CHARTS

CROSS REFERENCE TO RELATED APPLICATION

The present application is a continuation of and claims priority under 35 U.S.C. §120 of U.S. patent application Ser. No. 14/488,908 filed on Sep. 17, 2014, which is incorporated by reference in its entirety.

This application is related to the following commonly-owned, co-pending United States patent application filed on Jun. 17, 2014, the contents and disclosure of which is expressly incorporated by reference herein in its entirety: U.S. patent application Ser. No. 14/306,267 for "SOLVING AND ANSWERING ARITHMETIC AND ALGEBRAIC PROBLEMS USING NATURAL LANGUAGE PROCESSING".

FIELD OF THE INVENTION

The present invention relates generally to the field of computing, and more particularly to data interpretation and answering analytical questions.

BACKGROUND

A Question Answer (QA) System, which is corpus based, may provide answers by analyzing and processing the textual data available in the corpora. The questions asked may be based on textual information. However, in certain circumstances, the questions asked may be based on tables or charts in addition to the textual information.

SUMMARY

According to one embodiment, a method providing an answer to at least one analytical question containing at least one table or at least one chart is provided. The method may include receiving an input question associated with the at least one analytical question. The method may also include extracting a plurality of information from the input question based on a natural language analysis of the input question. The method may further include forming a well-defined sentence based on the extracted plurality of information. The method may include extracting at least one table or at least one chart associated with the input question. The method may include forming at least one mathematical equation based on the well-defined sentence and the extracted at least one table or at least one chart. The method may also include solving the at least one mathematical equation. The method may include determining the answer to the input question in natural language based on the solved at least one mathematical equation. The method may further include narrating the determined answer to the input question in natural language.

According to another embodiment, a computer system providing an answer to at least one analytical question containing at least one table or at least one chart is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving an input question associated with the at least one analytical question. The method may also include extracting a plurality of information from the input question based on a natural language analysis of the input question. The method may further include forming a well-defined sentence based on the extracted plurality of information. The method may include extracting at least one table or at least one chart associated with the input question. The method may include forming at least one mathematical equation based on the well-defined sentence and the extracted at least one table or at least one chart. The method may also include solving the at least one mathematical equation. The method may include determining the answer to the input question in natural language based on the solved at least one mathematical equation. The method may further include narrating the determined answer to the input question in natural language.

According to yet another embodiment, a computer program product providing an answer to at least one analytical question containing at least one table or at least one chart is provided. The computer program product may include one or more computer-readable storage devices and program instructions stored on at least one of the one or more tangible storage devices, the program instructions executable by a processor. The computer program product may also include program instructions to receive an input question associated with the at least one analytical question. The computer program product may also include program instructions to extract a plurality of information from the input question based on a natural language analysis of the input question. The computer program product may further include program instructions to form a well-defined sentence based on the extracted plurality of information. The computer program product may include program instructions to extract at least one table or at least one chart associated with the input question. The computer program product may include program instructions to form at least one mathematical equation based on the well-defined sentence and the extracted at least one table or at least one chart. The computer program product may also include program instructions to solve the at least one mathematical equation. The computer program product may include program instructions to determine the answer to the input question in natural language based on the solved at least one mathematical equation. The computer program product may further include program instructions to narrate the determined answer to the input question in natural language.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 illustrates an exemplary table with a corresponding question according to one embodiment;

FIG. 6 illustrates an example of natural language processing (NLP) performed on a question according to one embodiment;

FIG. 7 illustrates an example of mathematical equation formation from natural language and performing linear algebra and statistical modeling to get the solution according to one embodiment;

FIG. 8 illustrates an exemplary dictionary containing a mapping of verbs and mathematical operators according to one embodiment;

DETAILED DESCRIPTION

Figure 1:
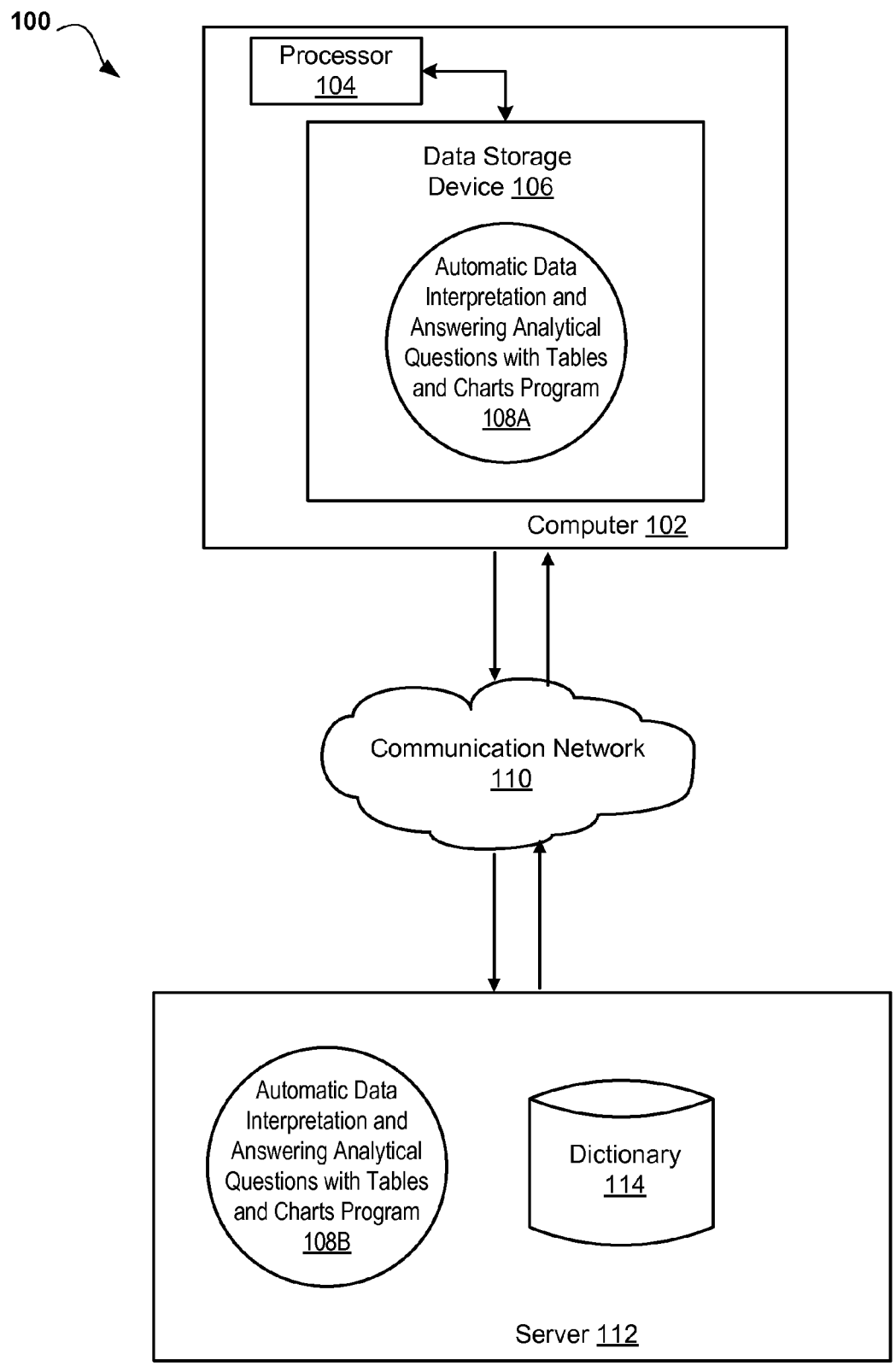
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to data interpretation and answering analytical questions. The following described exemplary embodiments provide a system, method and program product for data interpretation and answering analytical questions with tables and charts.

The following are definitions with respect to the tables and charts and existing as they are referred to herein:

Tables: A table is a means of arranging data in rows and columns. The use of tables may be pervasive throughout all communication, research and data analysis. Tables appear in print media, handwritten notes, computer software, architectural ornamentation, traffic signs and many other places. The precise conventions and terminology for describing tables varies depending on the context. Furthermore, tables may differ significantly in variety, structure, flexibility, notation, representation and use.

Bar Graphs: Bar graphs represent data in the form of columns or bars. Bar graphs can be horizontal or vertical. The length of the bar is proportional to the data value represented by it.

Line Graphs: Line graphs represent data in the form of straight lines that connect various data values. Both line graphs and bar graphs may be used to convey the same things and hence may be used inter-changeably. For example, a line graph can be generated by joining the tip of the bar graph.

Pie Charts: Pie charts derive their name from its shape, like that of a pie divided into various portions. Pie charts always represent data in the form of a percentage of the total, with the total percentage being 100. In such a chart, the length of the arc (and therefore the angle each sector subtends at the center) is proportional to the quantity it represents. Such charts are often used in the corporate world and in newspapers. Since a circle comprises 360 degrees, each percent of a pie-chart is equal to 360 divided by 100, or 3.6 degrees (which may be an important fact needed to perform calculations based on the interpretation of the pie chart).

Caselets:

In caselets, the mathematical data is represented in the form of a paragraph (i.e., textual information). As such, when interpreting information contained in a caselet, extracting data and establishing relationships between different data values may become difficult.

Combined Data Sets:

Data is represented in two or more different types of data sets. For example, data may be represented in a combination of a table and a graph or two or more graphs.

As previously explained, a Question Answer (QA) System, which is corpus based, may provide answers by analyzing and processing the textual data available in the corpora. The questions asked may be based on textual information. However, in certain circumstances, the questions asked may be based on tables or charts in addition to the textual information contained in the question. As such, when a typical descriptive question is asked based on a table or chart (or both a table and a chart) along with the textual information, it may be necessary to analyze the question, narrate the charts and tables, and form an equation to solve the analytical problem and narrate the answer. Therefore, it may be advantageous, among other things, to provide a solution for analytical problem solving, which may be required to enhance the computation and automation for a human machine interaction system, such as a Question Answer (QA) System. As such, the present embodiment may provide an automated process to enrich the power of a QA System by utilizing a computer vision application and pattern recognition along with natural language processing (NLP). Furthermore, rather than utilizing a knowledge-based system, the present embodiment may be based on mathematical formulae along with standard methodologies of natural language processing (NLP), computer vision, and pattern recognition.

According to at least one implementation, the present embodiment may be capable of understanding the problem described in texts; identifying tables and/or charts; and extracting information from tables and/or charts. The present embodiment may also include the interpretation of the data; understanding the question; converting texts and data into mathematical equations; solving a set of equations; and narrating the answer. Implementations of the present embodiment may utilize existing technology, such as image processing, optical character recognition, information retrieval, natural language processing (NLP), linear algebra, and statistical modeling.

The following are definitions with respect to the existing technology that may be utilized by the present embodiment:

Information Retrieval is the activity of obtaining information resources relevant to an information need from a collection of information resources. Searches may be based on metadata or on full-text (or other content-based) indexing.

Natural Language Processing (NLP) is a field of computer science, artificial intelligence, and linguistics concerned with the interactions between computers and human (natural) languages. As such, NLP is related to the area of human computer interaction.

Image Processing is any form of signal processing for which the input is an image, such as a photograph or video frame. The output of image processing may be either an image or a set of characteristics or parameters related to the image. Most image processing techniques involve treating the image as a two-dimensional signal and applying standard signal processing techniques to the image.

Optical Character Recognition (OCR) is the mechanical or electronic conversion of scanned images of handwritten, typewritten or printed text into machine-encoded text. OCR is widely used as a form of data entry from some sort of original paper data source, whether documents, sales receipts, mail, or any number of printed records. OCR is a common method of digitizing printed texts so that they can be electronically searched, stored more compactly, displayed on-line, and used in machine processes such as machine translation, text-to-speech and text mining. OCR is a field of research in pattern recognition, artificial intelligence and computer vision.

Linear Algebra is the branch of mathematics concerning vector spaces, often finite or countably infinite dimensional, as well as linear mappings between such spaces. Such an investigation is initially motivated by a system of linear equations in several unknowns. Such equations are naturally represented using the formalism of matrices and vectors.

Statistical Modeling is a method for formalization of relationships between variables in the form of mathematical equations. A statistical model describes how one or more random variables are related to one or more other variables. The model is statistical as the variables are not deterministically related, but are stochastically related.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for data interpretation and answering analytical questions with tables and charts. Implementations of the present embodiment may be used in an "intelligent" Question-Answer System (e.g., IBM Watson) with computer vision. Additionally, the present embodiment may be implemented as a new or extended feature of existing software which may deal with: predictive analytics (e.g. IBM SPSS); information retrieval and data mining (IBM Content Analytics); optical character recognition (OCR) and pattern recognition (IBM i2 Text Chart); etc. Furthermore, the framework may be implemented for a mobile application to scan and solve an analytical problem. The present embodiment may be used in the education sector to aide students and instructors. Additionally, the present embodiment may further be used for natural language processing (NLP), pattern recognition, mathematics, statistics, and psycho-linguistic research.

As such, implementations of the present embodiment may utilize existing technology, including, but not limited to the following:
Parsing/Syntactic Analysis: Parsing or Syntactic Analysis is the process of analyzing a string of symbols, either in natural language or in computer languages, according to the rules of a formal grammar. For example, Stanford Parser—http://nlp.stanford.edu:8080/parser/ or Carnegie Mellon University Parser: http://www.link.cs.cmu.edu/link/submit-sentence-4.html.
POS Tagging: In corpus linguistics, Part-Of-Speech Tagging (POS tagging or POST), also called grammatical tagging, is the process of marking up a word in a text (corpus) as corresponding to a particular part of speech, based on both its definition, as well as its context—i.e. relationship with adjacent and related words in a phrase, sentence, or paragraph. For example, University of Pennsylvania—Penn Tree Bank: http://www.cis.upenn.edu/~treebank/.
Typed Dependency Analysis: A representation of grammatical relations between words in a sentence. They have been designed to be easily understood and effectively used by people who want to extract textual relations. In general, dependencies are triplets: name of the relation, governor and dependent. For example, The Stanford Natural Language Processing Group—Typed Dependencies: http://nlp.stanford.edu/software/stanforddependencies.shtml.

In general, a data interpretation problem consists of three major segments: textual information, images, such as a table and/or chart, and the question (which contains text). According to at least one implementation, the present embodiment may solve data interpretation and similar problems automatically by analyzing the texts and images and combining them. As previously described, the present embodiment may solve data interpretation and similar problems by utilizing existing technology, such as image processing optical character recognition on the table or chart. As such, the present embodiment may analyze the chart type or table type by analyzing the following elements of the table or chart: shapes; the proportions of the shapes, such as heights depicted in a chart; the color overlay; the units (including numerals or categories); labels contained on the table or chart; data values (including the height depicted in a chart); lines or axes; legends or footers; and headers. with respect to pie charts in particular, the present embodiment may bound the box of the pie chart being analyzed and transform the shape of the pie chart in order to analyze the proportions, such as angles and the edges of the pie chart. The axis-aligned minimum bounding box for a given point set is its minimum bounding box subject to the constraint that the edges of the box are parallel to the (Cartesian) coordinate axes. Axis-aligned minimal bounding boxes may be used to approximate the location of an object in question and may be used as a descriptor of its shape.

Furthermore, as previously explained, implementations of the present embodiment may also utilize existing technology such as tagging, parsing, dependency analysis, and information retrieval using natural language processing (NLP) to analyze, interpret the chart and/or table in order to solve the question.

Additionally, as cross-referenced, the present embodiment may utilize the algorithms described with respect to the application entitled, "SOLVING AND ANSWERING ARITHMETIC AND ALGEBRAIC PROBLEMS USING NATURAL LANGUAGE PROCESSING" incorporated by reference herein to form and solve mathematical equations. Therefore, the present embodiment may include a dictionary containing a mapping between verbs or action words and mathematical operators. As such, for each verb or action word, the effect of the mathematical operator on the operands (subject(s) and the object(s)) may be specified in the dictionary. Typically, coefficients or numerals in a sentence may act as multipliers with the object(s) or subject(s) to which they refer. This may depend on the context, and may be determined through NLP Parsing and the determination of typed dependencies. A sample mapping of certain verbs and typical mathematical operators add, subtract, multiply, divide, equals (+ − * / =) may be included in the dictionary. The mapping approach included in at least one implementation of the present embodiment may be used in a generic way to resolve how an operator will operate on a subject or object in a given sentence containing a specific verb or action word.

Referring now to FIG. 1, an exemplary networked computer environment 100 in accordance with one embodiment is depicted. The networked computer environment 100 may include a computer 102 with a processor 104 and a data storage device 106 that is enabled to run an Automatic Data Interpretation and Answering Analytical Questions with Tables and Charts Program 108A. The networked computer environment 100 may also include a server 112 that is enabled to run an Automatic Data Interpretation and Answering Analytical Questions with Tables and Charts Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. The network computer environment may also include a dictionary 114 which may contain a mapping between verbs or action words and mathematical operators, such that for each verb or action word, the effect of the mathematical operator on the operands (subject(s) and the object(s) of a sentence) may be specified in the dictionary. According to at least one implementation, the dictionary 114 may be created, updated, and maintained as a separate entity. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 10, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an Automatic Data Interpretation and Answering Analytical Questions with Tables and Charts Program 108A and 108B may run on the client computer 102 or on the server computer 112. The Automatic Data Interpretation and Answering Analytical Questions with Tables and Charts Program 108A, 108B may be utilized to solve arithmetic and algebraic problems. For example, a user using an Automatic Data Interpretation and Answering Analytical Questions with Tables and Charts Program 108A, running on a client computer 102, may connect via a communication network 110 to server computer 112, which may also be running an Automatic Data Interpretation and Answering Analytical Questions with Tables and Charts Program 108B. Furthermore, the user using client computer 102 or server 112 may utilize the Automatic Data Interpretation and Answering Analytical Questions with Tables and Charts Program 108A, 108B to perform data interpretation and to answer analytical questions with tables and charts. The Automatic Data Interpretation and Answering Analytical Questions with Tables and Charts method is explained in further detail below with respect to FIG. 9.

Figure 2:
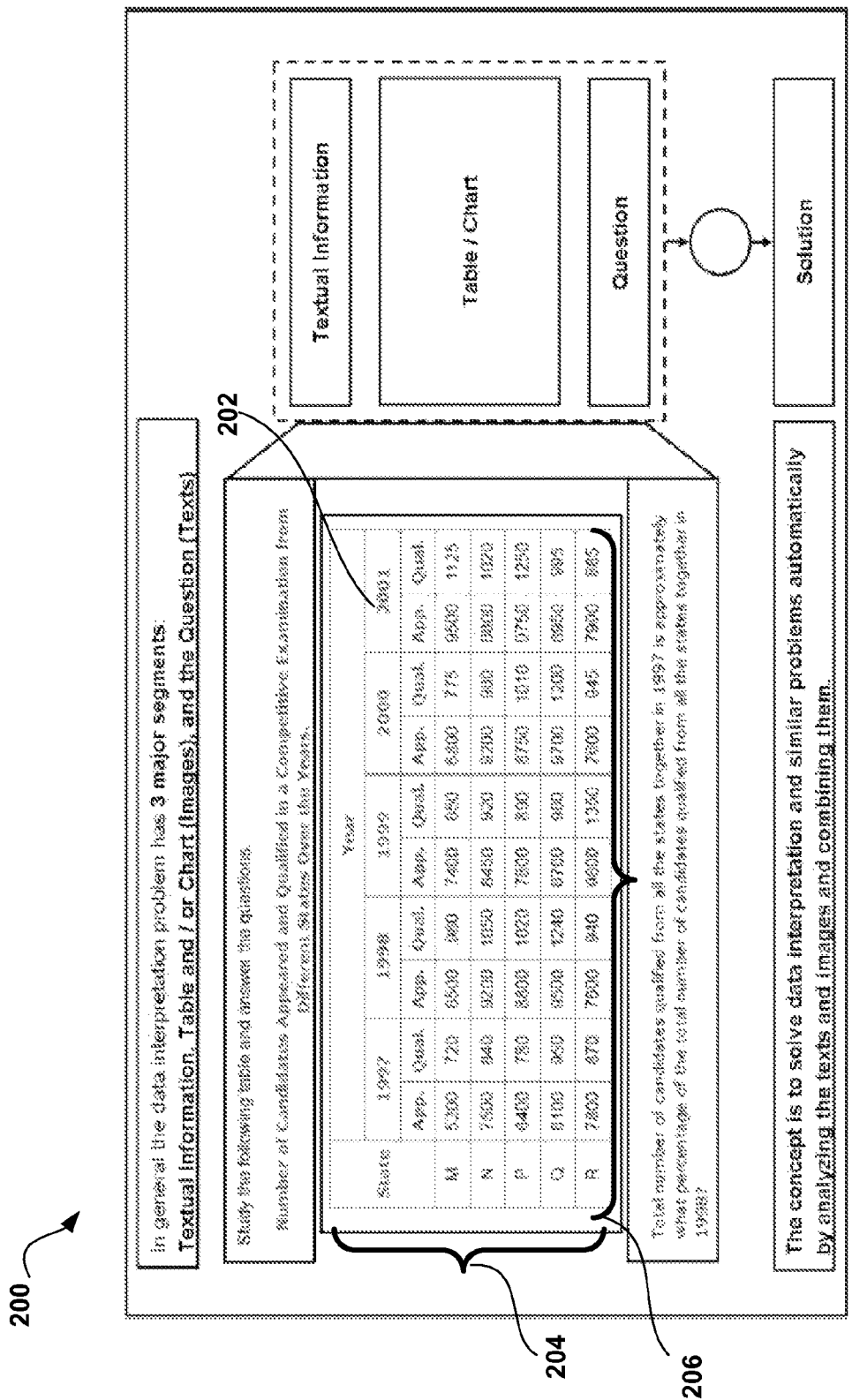
FIG. 2 illustrates an exemplary table according to one embodiment.

Referring now to FIG. 2, an exemplary table 200 in accordance with one embodiment is depicted. As previously explained, a table 200 is a means of arranging data 202 in rows 204 and columns 206. The use of tables 200 may be pervasive throughout all communication, research and data analysis. Tables 200 may appear in print media, handwritten notes, computer software, architectural ornamentation, traffic signs and many other places. The precise conventions and terminology for describing tables 200 may vary depending on the context. Furthermore, tables 200 may differ significantly in variety, structure, flexibility, notation, representation and use.

Figure 3:
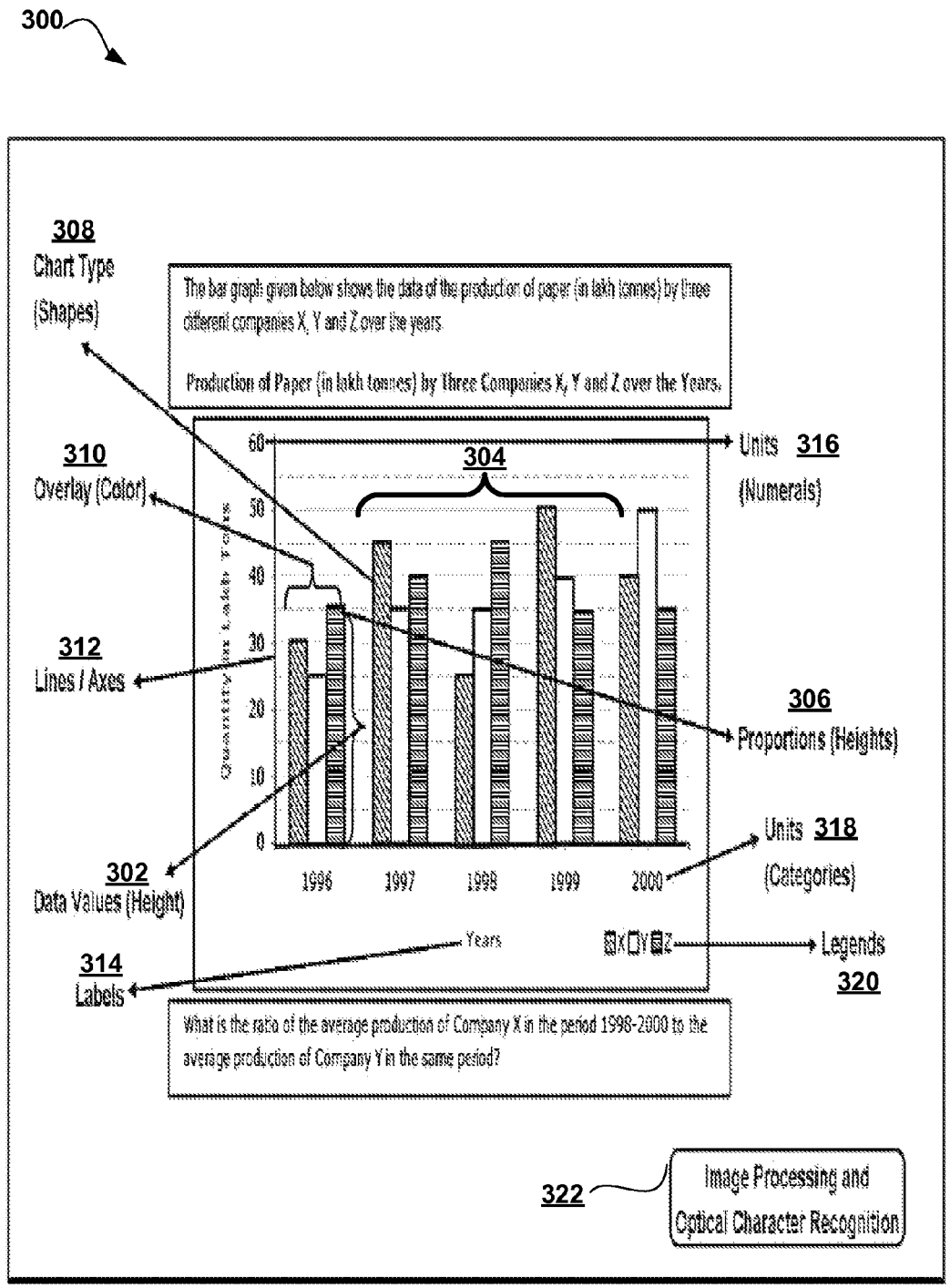
FIG. 3 illustrates an exemplary bar graph according to one embodiment.

Referring now to FIG. 3, an exemplary bar graph 300 in accordance with one embodiment is depicted. As previously explained, a bar graph 300 may represent data 302 in the form of columns 304 or bars 304. Bar graphs 300 may be horizontal or vertical. The length of the bar 306 is proportional to the data value 302 represented by it. Furthermore, each bar graph 300 may be of a certain type (i.e., shapes) 308 and may contain attributes such as overlay (i.e., color) 310; lines or axes 312; labels 314; units (such as numerals) 316; units (such as categories) 318; and legends 320. According to at least one implementation of the present embodiment, image processing and optical recognition 322 may be performed to extract information in image format from a bar graph 300.

Figure 4:
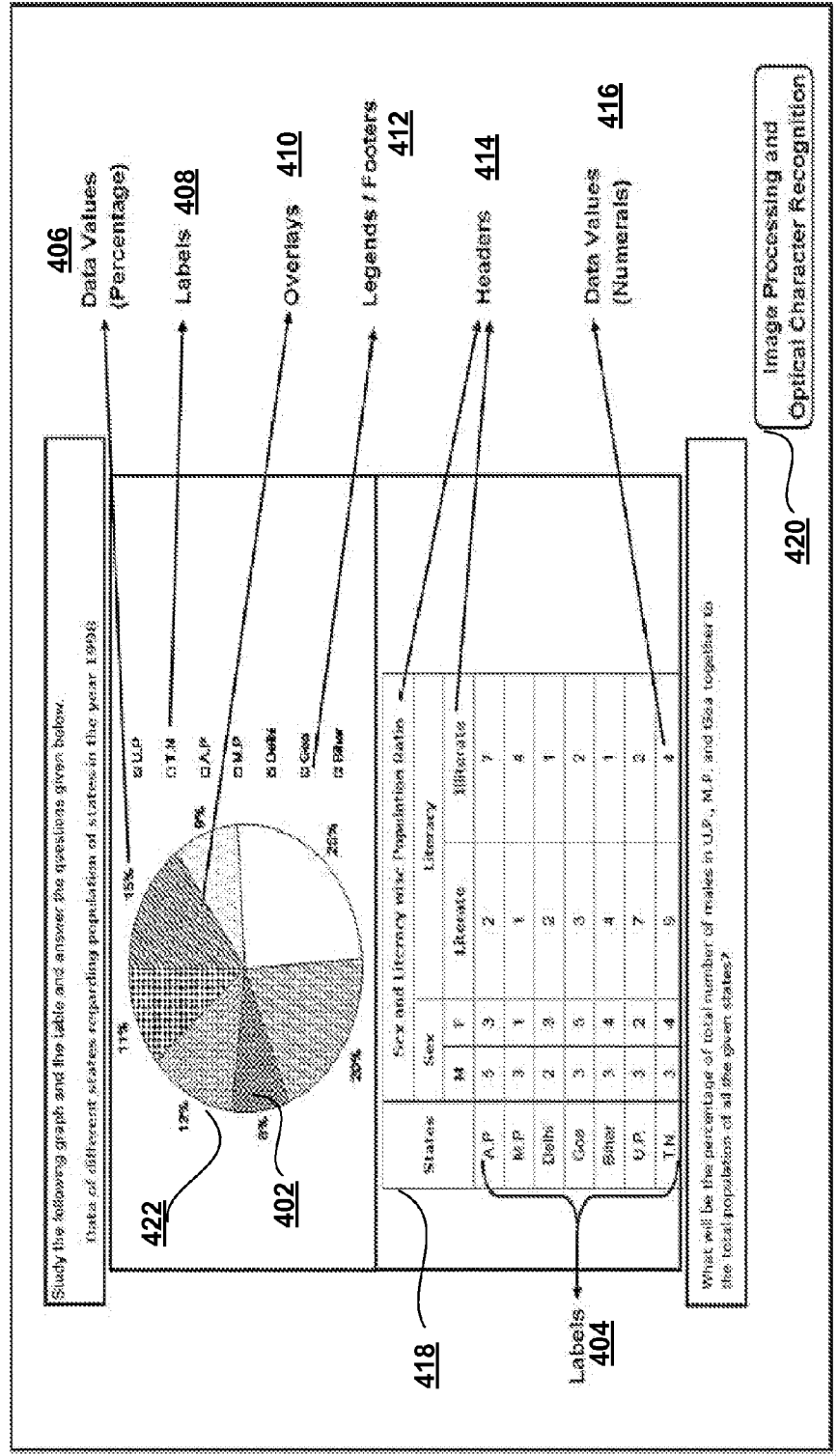
FIG. 4 illustrates an exemplary pie chart and table according to one embodiment.

Referring now to FIG. 4, an exemplary pie chart and table 400 in accordance with one embodiment is depicted. As previously described, pie charts 422 derive their name from its shape, like that of a pie divided into various portions 402. Pie charts 422 always represent data 406 in the form of a percentage of the total, with the total percentage being 100. With respect to a pie chart 422, the length of the arc (and therefore the angle each sector subtends at the center) is proportional to the quantity it represents. Pie charts 422 are often used in the corporate world and in newspapers. Since a circle comprises 360 degrees, each percent of a pie chart 422 is equal to 360 divided by 100, or 3.6 degrees. A pie chart 422 may include labels 408; overlays 410; and legends or footers 412. A pie chart 422 may be used in conjunction with a table 418 to answer a particular question. A table 418 may include labels 404; headers 414; and data values (numerals) 416. According to at least one implementation of the present embodiment, image processing and optical recognition 420 may be performed to extract information in image format from a table 418 or a pie chart 422.

Referring now to FIG. 5, an exemplary table with a corresponding question 500 in accordance with one embodiment is depicted. As previously described, the present embodiment may perform information retrieval and natural language processing (NLP) 512. According to one implementation, the method may analyze an input question 502 (associated with a table 504) using natural language processing (NLP) methods (previously described), such as POS tagging 506, parsing 508, and dependency analysis 510 in order to extract information such as subjects, objects, and actions from the input question.

Figure 6:
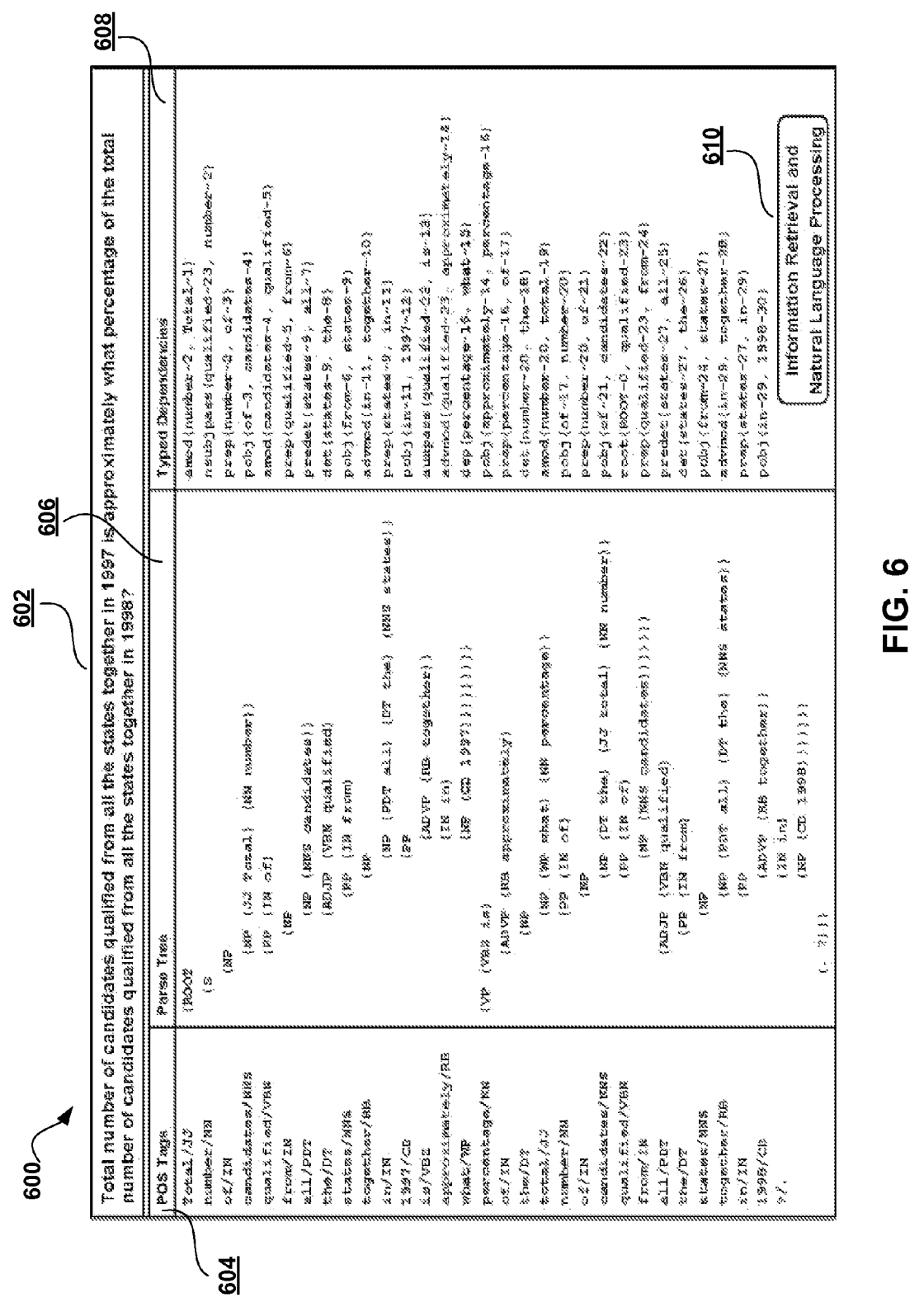

Referring now to FIG. 6, an example of natural language processing (NLP) 600 performed on a question 602 in accordance with one embodiment is depicted. As previously described, implementations of the present embodiment may utilize natural language processing (NLP) and information retrieval 610, such as POS tagging 604; parsing or syntactic analysis 606; and typed dependencies 608. As previously explained, parsing or syntactic analysis 606 is the process of analyzing a string of symbols, either in natural language or in computer languages, according to the rules of a formal grammar. POS tagging 604 is the process of marking up a word in a text (corpus) as corresponding to a particular part of speech, based on both its definition, as well as its context—i.e. relationship with adjacent and related words in a phrase, sentence, or paragraph. Typed dependency analysis 608 is a representation of grammatical relations between words in a sentence.

Referring now to FIG. 7, an example of mathematical equation formation from natural language and performing linear algebra and statistical modeling to get the solution 700 in accordance with one embodiment is depicted. According to one implementation, linear algebra and statistical modeling 702 may performed on a question 704. As previously described, linear algebra is the branch of mathematics concerning vector spaces, often finite or countably infinite dimensional, as well as linear mappings between such spaces. Such an investigation is initially motivated by a system of linear equations in several unknowns. Such equations are naturally represented using the formalism of matrices and vectors. Statistical modeling 702 is a method for formalization of relationships between variables in the form of mathematical equations. A statistical model 700 describes how one or more random variables are related to one or more other variables. The model is statistical as the variables are not deterministically but stochastically related.

Referring now to FIG. 8, an exemplary dictionary 8000 containing a mapping of verbs and mathematical operators in accordance with one embodiment is depicted. According to at least one implementation, the present embodiment may include a dictionary 114 containing a mapping between verbs 8002 or action words 8002 and mathematical operators 8004. As such, for each verb 8002 or action word 8002, the effect of the mathematical operator 8004 on the operands (subject(s) 8006 and the object(s) 8008) may be specified in the dictionary 114. Typically, coefficients or numerals 8010 in a sentence act as multipliers with the object(s) 8008 or subject(s) 8006 to which they refer. This may depend on the context, and may be determined through natural language processing (NLP) parsing and determination of typed dependencies.

A sample mapping of certain verbs 8002 and typical mathematical operators 8004, such as "add", "subtract", "multiply", "divide", "equals" (e.g., (+ − * / =)) is illustrated in FIG. 8 and may be included in the dictionary 114. According to the present embodiment, the mapping may be used in a generic way to resolve how an operator 8004 may operate on a subject 8006 or object 8008 in a given sentence containing a specific verb or action word.

Figure 9:
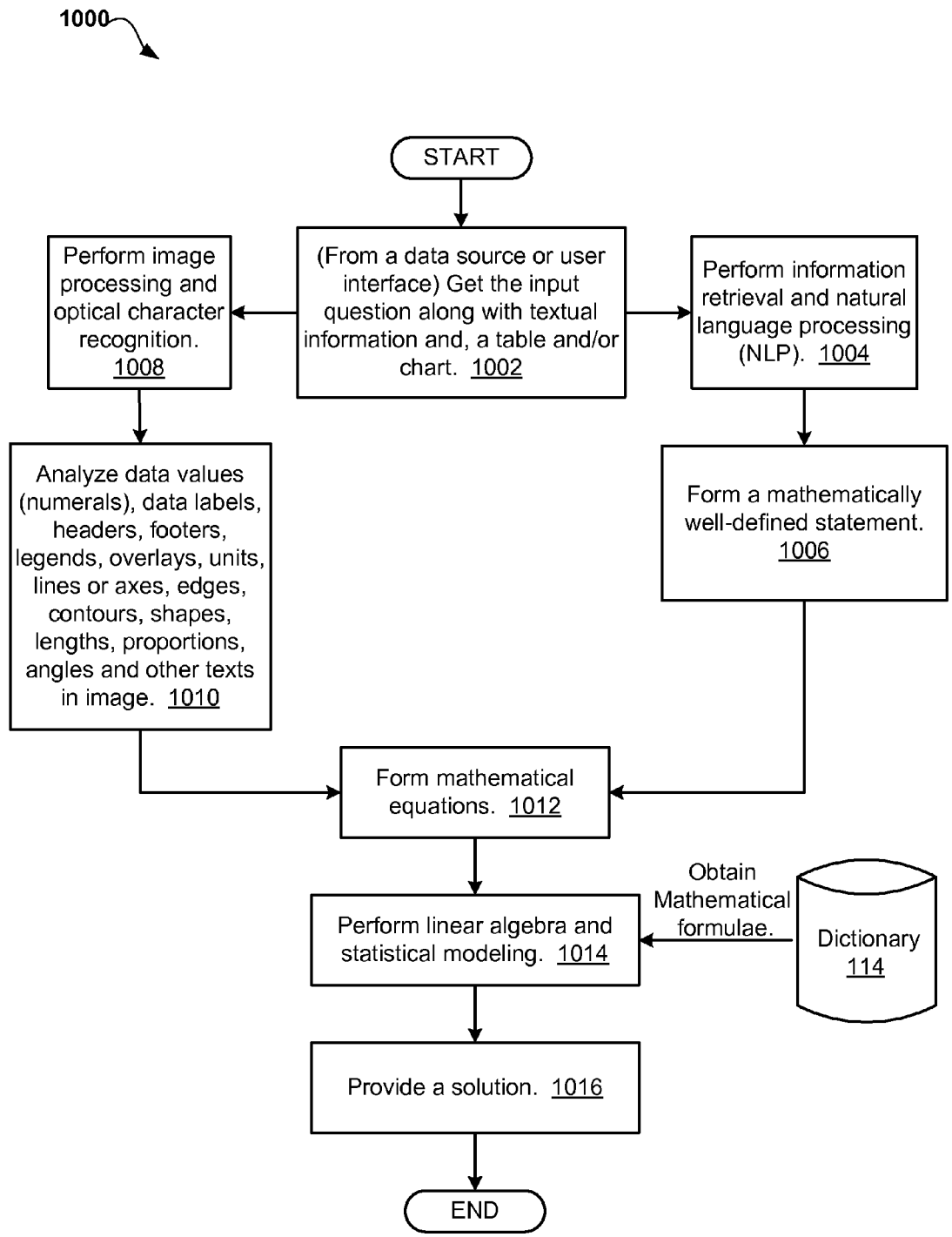
FIG. 9 is an operational flowchart illustrating an algorithm data interpretation and answering analytical questions with tables and charts according to one embodiment.

Referring now to FIG. 9, an operational flowchart 1000 illustrating an algorithm for data interpretation and answering analytical questions with tables and charts in accordance with one embodiment is depicted. According to at least one implementation, interpretation of an analytical question with tables and charts may be performed by mapping the analytical question into a mathematical relation. As such, the Automatic Data Interpretation and Answering Analytical Questions with Tables and Charts Program 108A, 108B (FIG. 1) may extract information from the tables and charts associated with the analytical question and represent the extracted information in a semi-structured format to further link the extracted information with the analytical question and the mathematical relation. Therefore, the present embodiment may form a set of equations based on the mathematical relation and extracted information from the tables and charts associated with the analytical question and solve the equations to obtain an answer to the question.

At 1002, the method may get an input question containing tables and charts along with textual information from a data source or user interface. For example, an input question may be a question such as, ("The total number of candidates qualified from all the states together in 1997 is approximately what percentage of the total number of candidates qualified from all the states together in 1998?").

Then at 1004, the method may perform information retrieval and natural language processing (NLP). According to one implementation, the method may analyze the input question using natural language processing (NLP) methods and extract information such as subjects, objects, and actions from the input question.

Next at 1006, the method may form a mathematically well-defined statement based on the information extracted from the input question. As such, the method may map the information extracted in step 1004 into a mathematically well-defined statement (i.e., mathematical relations). According to one implementation, the method may use the mathematically well-defined statement to interpret the input question.

Then at 1008, the method may perform image processing and optical character recognition. As such, the method may extract information in image format from a table or chart associated with the input question by using existing technology, such as pattern recognition and optical character recognition for data interpretation.

Next at 1010, the method may analyze the extracted information. Therefore, the method may analyze data values (i.e., numerals), data labels, headers, footer, legends, overlays, units, lines or axes, edges, contours, shapes, lengths, proportions, angles and other texts that have been extracted from the table or chart associated with the input question.

Then, at 1012, a mathematical equation may be formed. According to the present embodiment, a set of mathematical equations may be formed from the extracted table and chart information and based on the mathematical relations that have been determined.

Next at 1014, linear algebra and statistical modeling may be performed. According to one implementation, mathematical formulae may be obtained from a dictionary 114 (FIG. 1) to aide in performing the linear algebra and statistical modeling. As such, the present embodiment may solve the set of mathematical equations using a standard mathematical formula to determine an answer to the input question.

Then at 1016, the method may provide a solution to the input question. Therefore, the method may determine an answer to the input question in natural language based on the solved mathematical equation and then narrate the answer to the input question in natural language.

As cross-referenced, the present embodiment may utilize the algorithms described with respect to the application entitled, "SOLVING AND ANSWERING ARITHMETIC AND ALGEBRAIC PROBLEMS USING NATURAL LANGUAGE PROCESSING" incorporated by reference herein to form and solve mathematical equations.

It may be appreciated that FIG. 9 provides only an illustration of one implementation and does not imply any limitations with regard to how different embodiments may be implemented. Many modifications to the depicted environments may be made based on design and implementation requirements.

Figure 10:
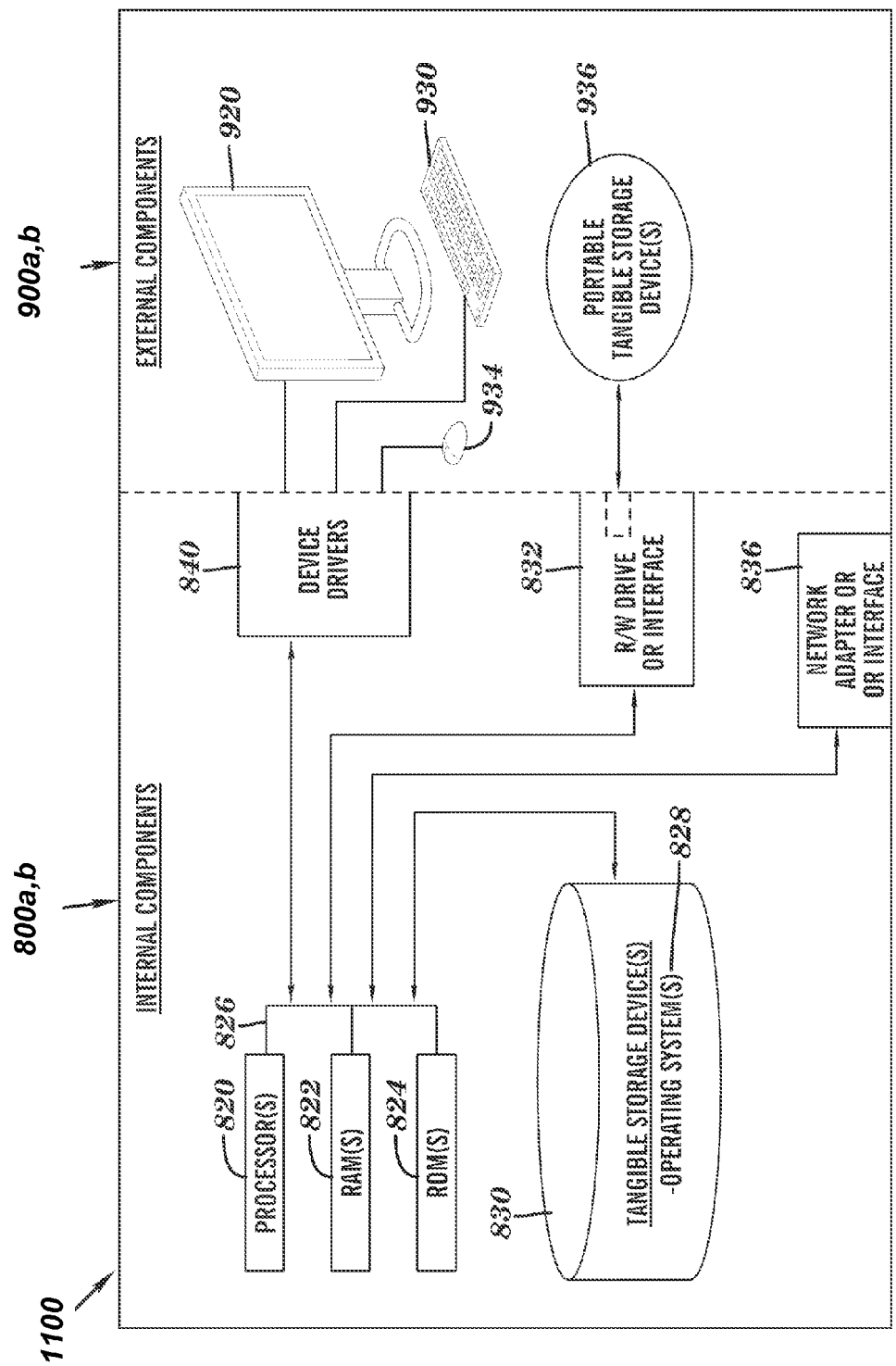
FIG. 10 is a block diagram of internal and external components of computers and servers depicted in FIG. 1 according to one embodiment.

FIG. 10 is a block diagram 1100 of internal and external components of computers depicted in FIG. 1 in accordance with an illustrative embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 10 Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Automatic Data Interpretation and Answering Analytical Questions with Tables and Charts Program 108A (FIG. 1) in client computer 102 (FIG. 1) and Automatic Data Interpretation and Answering Analytical Questions with Tables and Charts Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Automatic Data Interpretation and Answering Analytical Questions with Tables and Charts Program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Automatic Data Interpretation and Answering Analytical Questions with Tables and Charts Program 108A (FIG. 1) in client computer 102 (FIG. 1) and Automatic Data Interpretation and Answering Analytical Questions with Tables and Charts Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Automatic Data Interpretation and Answering Analytical Questions with Tables and Charts Program 108A (FIG. 1) in client computer 102 (FIG. 1) and the Automatic Data Interpretation and Answering Analytical Questions with Tables and Charts Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method providing an answer to at least one analytical question containing at least one table or at least one chart, the method comprising:
receiving an input question containing at least one table or at least one chart, wherein the received input question is entered via a graphical user interface associated with a computer and the received input question is associated with the at least one analytical question;
extracting, by the computer, a plurality of information from the input question based on a natural language analysis of the input question;
forming a well-defined statement based on the extracted plurality of information;
extracting, by the computer, the at least one table or at least one chart associated with the input question;
extracting, by the computer, a plurality of information from the extracted at least one table or at least one chart, wherein the extracted plurality of information comprises a data value, a data label, a header, a footer, a legend, an overlay, a unit, a line, an edge, a contour, a shape, a length, a proportion, and an angle;
forming at least one mathematical equation based on the well-defined statement and the extracted plurality of information from the extracted at least one table or at least one chart;
solving the at least one mathematical equation;
determining the answer to the input question in natural language based on the solved at least one mathematical equation; and
narrating the determined answer to the input question in natural language, wherein narrating the determined answer to the input question comprises displaying the determined answer to the input question via the graphical user interface.

2. The method of claim 1, wherein the extracted at least one table or at least one chart associated with the at least one analytical question is extracted in an image format.

3. The method of claim 2, wherein the extracted image format includes extracted information associated with the extracted at least one table or at least one chart.

4. The method of claim 3, wherein the extracted information comprises at least one of a data label, a header, a footer, a legend, an overlay, a data value or numeral, a unit, a line or an axis, a shape, a length, a proportion, and an angle.

5. The method of claim 3, wherein the forming at least one mathematical equation comprises performing data interpretation on the extracted information.

6. The method of claim 2, wherein the extracting the image format comprises the use of existing technology including at least one of pattern recognition technology and optical character recognition technology.

7. The method of claim 1, wherein solving the at least one formed mathematical equation comprises using a standard mathematical formula.

8. The method of claim 1, wherein the forming at least one mathematical equation and solving the at least one formed mathematical equation comprises using a dictionary containing a mapping between verbs and math operators.

\* \* \* \* \*